United States Patent [19]

Stoltze et al.

[11] Patent Number: 4,815,936

[45] Date of Patent: Mar. 28, 1989

[54] WIND TURBINE SHUTDOWN SYSTEM

[75] Inventors: Christopher L. Stoltze, Tolland; Joel E. Parker, West Suffield, both of Conn.

[73] Assignee: United Technologies Corporation, Hartford, Conn.

[21] Appl. No.: 214,971

[22] Filed: Jul. 5, 1988

[51] Int. Cl.[4] .................... F03D 11/04; F03D 7/04

[52] U.S. Cl. .......................... 416/9; 416/13; 416/41; 416/DIG. 6

[58] Field of Search ............... 416/9, 10, 11, 13, 14, 416/170 A, DIG. 6, 41 A

[56] References Cited

U.S. PATENT DOCUMENTS

| | | | |
|---|---|---|---|
| 237,277 | 2/1881 | Hodges . | |
| 769,190 | 9/1904 | Simpson . | |
| 837,795 | 12/1906 | Cassell . | |
| 932,260 | 8/1909 | Fifield . | |
| 1,757,039 | 5/1930 | Constantin . | |
| 2,145,511 | 1/1939 | Grohmann | 290/44 |
| 2,352,089 | 6/1944 | Fagerlund . | |
| 2,360,791 | 10/1944 | Putnam | 416/9 X |
| 2,454,058 | 11/1948 | Hays | 60/57 |
| 2,517,135 | 8/1950 | Rudisill | 290/44 |
| 3,902,072 | 8/1975 | Quinn | 416/9 X |
| 4,213,734 | 7/1980 | Lagg | 416/41 A X |
| 4,280,061 | 7/1981 | Lawson-Tancred | 290/55 |
| 4,316,096 | 2/1982 | Syverson | 416/13 X |
| 4,372,732 | 2/1982 | Browning | 416/14 |
| 4,408,954 | 10/1983 | Earle | 416/9 |
| 4,435,647 | 3/1984 | Harner et al. | 416/41 A X |
| 4,439,105 | 3/1984 | Hohenemser | 416/13 |
| 4,515,525 | 5/1985 | Doman | 416/11 |
| 4,565,929 | 1/1986 | Baskin et al. | 290/44 |
| 4,571,155 | 2/1986 | Angeloff | 416/13 |
| 4,692,094 | 9/1987 | Kulinyak | 416/DIG. 6 X |

FOREIGN PATENT DOCUMENTS

| | | | |
|---|---|---|---|
| 3425423 | 1/1986 | Fed. Rep. of Germany | 416/9 |
| 2067247 | 7/1981 | United Kingdom | 416/10 |

Primary Examiner—Everette A. Powell, Jr.
Attorney, Agent, or Firm—Lloyd D. Doigan

[57] ABSTRACT

According to the invention, a wind turbine 10 incorporates a wind vane 105 which mechanically controls a valve 100 that directs the output of a turbine driven hydraulic pump 75 to yaw the turbine out of the wind upon a loss of system power or load. The turbine yaws out of the wind at an angular rate that is roughly proportional to rotor speed so that excessive teeter amplitudes are not encountered. The mechanically driven pump advantageously provides power to yaw the rotor out of the wind even if all electrical power is lost.

12 Claims, 1 Drawing Sheet

WIND TURBINE SHUTDOWN SYSTEM

TECHNICAL FIELD

This invention relates to wind turbines and more particularly to a wind turbine which yaws out of the wind in an emergency.

BACKGROUND ART

Some wind turbines utilize a rotor which includes one or more fixed pitch, airfoil blades. The blades are connected via a teetering hub, a shaft and a gearbox to an electric generator or alternator The power output of the wind turbine is regulated by controlling the angle (known as yaw angle) between a plane formed by the rotating blades and the direction of the wind. Full power may be achieved when the plane of the blades is perpendicular to the direction of the wind (i.e. "into" the wind). No power is achieved (and the aerodynamic torque upon the rotor is minimized) when the plane of the blades is parallel to the direction of the wind (i.e. "out" of the wind). The power output of the system may be varied by yawing the rotor angularly by degree into and out of the wind.

Some systems have automatic controls which set the yaw angle to optimize the power output of the system. In an emergency, as when the system load is lost or the automatic control has lost power, the wind turbine must be yawed out of the wind to prevent the blades from overspeeding. Overspeeding may cause severe damage to wind turbine components.

DISCLOSURE OF THE INVENTION

Accordingly, it is an object of the invention to yaw a blade of a wind turbine out of the wind in the event of an emergency.

It is a further object of the invention to yaw the blade of a wind turbine out of the wind without encountering excessive teeter amplitudes.

According to the invention, a wind turbine includes a wind direction sensor which mechanically controls a valve that directs the output of a mechanically blade driven hydraulic pump to yaw the blade out of the wind in an emergency. The pump yaws the blade at a rate that is roughly proportional to blade speed so that excessive teeter amplitudes are not encountered. The blade driven pump provides power to yaw the blade out of the wind even if all electrical power is lost.

These and other objects, features and advantages of the present invention will become more apparent in light of the following detailed description of a best mode embodiment thereof, as illustrated in the accompanying drawing.

BEST MODE FOR CARRYING OUT THE INVENTION

Figures 1, 2:
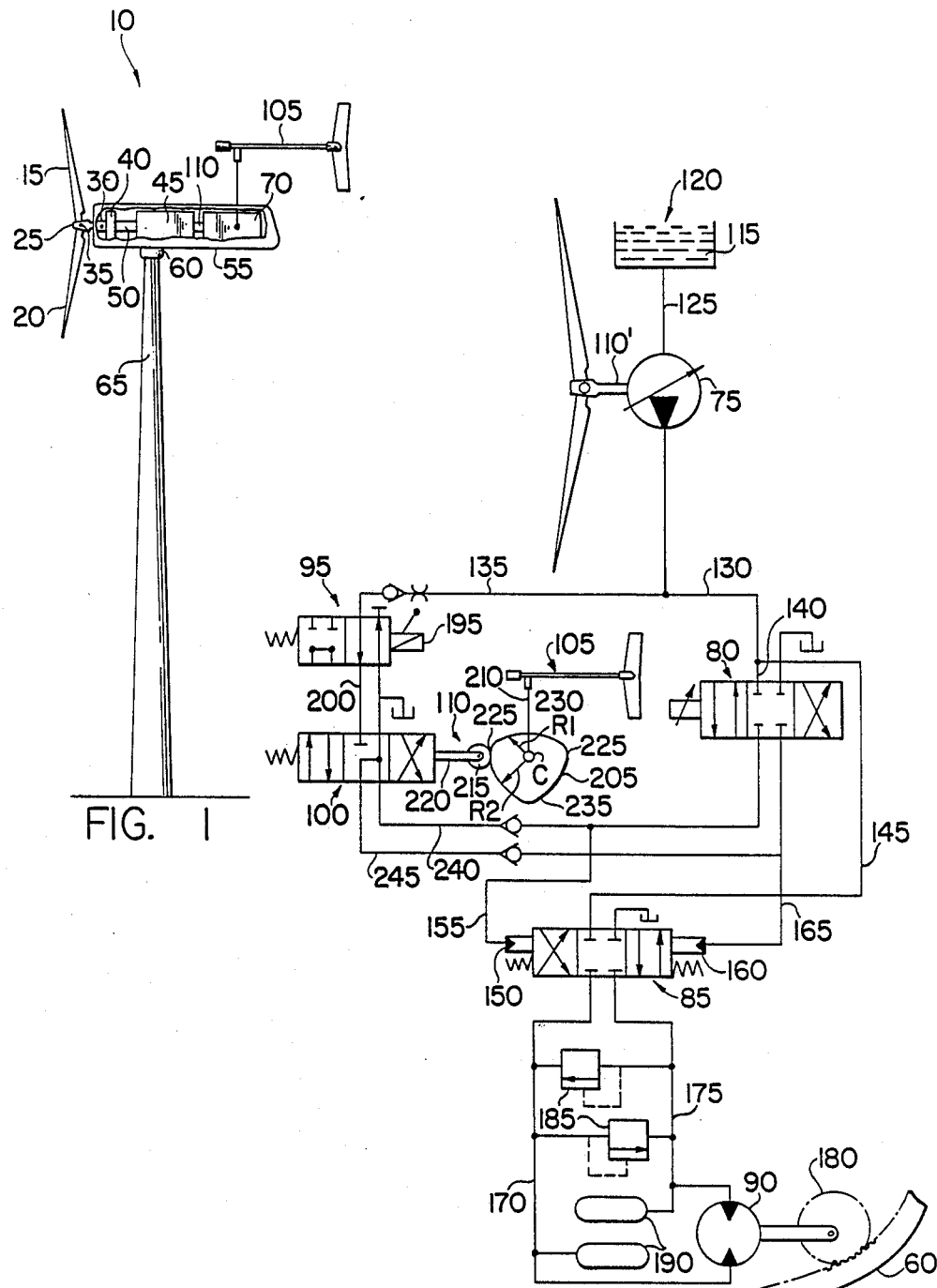
FIG. 1 relates to a wind turbine which incorporates the emergency shutdown system of the invention.
FIG. 2 shows a schematic diagram of the emergency shutdown system of FIG. 1.

Referring to FIG. 1, a wind turbine 10 is shown. The wind turbine comprises a pair of airfoil blades 15 and 20 that are mounted to a teetering rotatable hub 25. The blades and the hub form a rotor. The hub is pivotally connected to shaft 30 by a teeter pin 35. The shaft 30 connects to a gearbox 40 which steps up the rotational speed of the hub and blades to a value equal to the desired speed of rotation of electric generator or alternator 45. The generator or alternator is connected to the gearbox by shaft 50. A nacelle 55 encloses the generator, the gearbox, the connecting shafts, a yaw bearing 60, which rotatably supports the nacelle in a tall, flexible, tower 65, and the emergency shutdown and control system 70.

The emergency shutdown and control system 70 includes: a first circuit including a pressure regulated, variable displacement pump 75, a command valve 80, a directional valve 85, and a yaw motor 90; and, a second circuit including a check valve 95, a control valve 100, a mechanical wind vane 105, and a camming mechanism 110 for connecting the wind vane and the control valve. The first and second circuits are controlled by a conventional electrical controller (not shown). The controller may have a circuit (not shown), as is known in the art, for comparing the yaw angle of the rotor with a yaw angle of the rotor that was commanded by the controller.

The pump 75 is driven mechanically by the rotor by any known means such as a shaft 110. The pump draws hydraulic fluid 115 from a reservoir 120 via line 125 The pump impels the fluid to the directional and command valves 85, 80 via line 130 and to the second circuit via line 135. A relatively small amount of the fluid in line 130 is directed to the command valve 80 via line 140 and a relatively large amount of the fluid in line 130 is directed to the directional valve 85 via line 145. The command valve is positioned electrically by the controller, as is known in the art, to direct fluid to the left side 150 of the directional valve via line 155 or to the right side 160 of the directional valve via line 165.

The directional valve 85 selectively directs the relatively large amount of fluid to drive the yaw motor 90 in a first rotational direction via line 170 or to drive the yaw motor in a second rotational direction via line 175. The yaw motor drives yaw gear 180 which, in turn, cooperates with the yaw bearing 60 to angularly rotate the rotor into and out of the wind as desired. A pair of pressure relief valves 185 and accumulators 190 protect the yaw motor from pressure overloads as is known in the art.

As noted supra, the pump 75 directs fluid to the second circuit via line 135. The check valve 95, which is normally closed by a solenoid 195, regulates flow from line 135 to the control valve 100 via line 200. The wind vane is attached to the control valve by the camming mechanism 110.

The camming mechanism 110 is comprised of a cam wheel 205, which is attached to the wind vane by a shaft 210, and a cam rider 215, which is attached via a plunger 220 to the control valve. The cam wheel has a center C, a pair of relatively flat, nulling portions 225, a top portion 230 having a radius R1 which progressively increases for about 90° from each nulling portion, and a bottom portion 235 having a radius R2 which progressively decreases for about 90° from each nulling portion. The cam wheel 205 is freely rotatable within the emergency shutdown and control system such that the position of the cam wheel is determined by the position of the vane 105. The cam rider follows the contour of the cam wheel as the rotor yaws into and out of the wind.

The position of the control valve is mechanically determined by the yaw angle of the rotor and the position of the wind vane. As shown, clockwise rotation of the cam wheel pushes the control valve via the cam rider and the plunger to the left. Conversely, counterclockwise rotation of the cam allows the valve to move towards the right. Also, as shown, counterclockwise rotation of the nacelle 55 (and the emergency shutdown and control system) causes the cam rider 215 to follow the contour of the cam wheel to push the control valve to the left. Conversely, clockwise rotation of the nacelle allows the control valve to move towards the right as the cam rider follows the contour of the cam wheel.

The control valve is connected to the left side 150 of the directional valve via line 240 and line 155 and to the right side 160 of the directional valve via line 245 and line 165.

During normal operation, the controller positions the command valve 80 which, as is known in the art, sends a portion of the hydraulic fluid to either the left side 155 or right side 160 of the directional valve 85. The directional valve having been positioned by the hydraulic fluid, in turn, directs the output of the pump in line 145 to the yaw motor 90 which drives yaw gear 180 which cooperates with the yaw bearing to yaw the turbine into or out of the wind as required. The solenoid 195 is receiving an electrical signal from the controller so that hydraulic fluid does not flow through the second circuit.

In an emergency situation (such as a loss of system load or power, or the rotor is not being positioned to the desired yaw angle), an electrical signal is not sent by the controller to the solenoid 195. As a result, the solenoid is deactivated and the check valve 95 allows hydraulic fluid to flow to the control valve 100. The vane 105 continuously positions the cam wheel 205. As the rotor yaws, the cam rider 215 follows the contour of the cam wheel thereby positioning the control valve 100. The control valve then directs a relatively large flow of hydraulic fluid via lines 240 and 155 to the left side 150 of the directional valve, or via lines 245 and 165 to the right side 160 of the directional valve 85 to move the blades out of the wind. Such relatively large flow overpowers any flow from the command valve 80 to position the directional valve to drive the yaw motor 90.

The cam rider 215 follows the contour of the cam wheel 205 until the cam rider is disposed upon a null portion 225 of the cam wheel at which point the control valve 100 is nulled and does not allow flow therethrough. The rotor is now out of the wind, effectively minimizing aerodynamic rotor torque so that overspeed of the blades is avoided. As the rotor moves out of the wind, the blades slow. Since the output of the pump is roughly proportional to the speed of rotor rotation, the rate of yaw diminishes as the rotor moves out of the wind. Excessive teeter is thereby avoided as teeter amplitude versus yaw rate is inversely proportional to the rotor speed.

While a particular embodiment of the present invention has been shown and described, it will be appreciated by those skilled in the art that various equivalent constructions may be employed without departing from the present invention and the true spirit and scope. For instance, one of ordinary skill in the art, may substitute an optical or other signal for the electrical signal provided by the controller to position the command valve 80 and the check valve 95.

What is claimed is:

1. A wind turbine comprising an airfoil blade mounted on a rotatable hub, the improvement characterized by:
   an hydraulic pump driven by said blade for providing an hydraulic output,
   an hydraulic motor for yawing said blade in relation to a wind stream,
   a control means for yawing said blade into and out of the wind stream as desired,
   a first circuit means directed by said control means for controlling a first flow of said hydraulic output to drive said hydraulic motor such that said blade is yawed into and out of the wind stream, and
   a second circuit means for mechanically controlling a second flow of said hydraulic output to control said hydraulic motor such that said blade is yawed out of the wind in an emergency.

2. The wind turbine of claim 1 wherein said second circuit means is characterized by:
   a first signal controlled valve, said valve allowing said second flow therethrough upon a cessation of said signal thereto, said signal being provided by said control means,
   a second valve for controlling said second flow to control said hydraulic motor, and
   means for positioning said second valve such that said blade is yawed out of the wind.

3. The wind turbine of claim 2 wherein said means for positioning said second valve is characterized by:
   a wind vane,
   a camming means attaching to said wind vane and to said second valve for positioning said second valve as a function of an angle between a plane formed by said rotating blade and a direction of said wind stream, said camming means nulling said second valve if said said plane is oriented approximately 0° to said direction of said wind stream.

4. The wind turbine of claim 3 wherein said camming means is characterized by:
   a camming wheel attaching to and rotating with said vane, and
   a cam rider attaching to said second valve said cam rider following a contour of said camming wheel as said camming wheel and said cam rider rotate relative to each other positioning said second valve thereby.

5. A wind turbine comprising an airfoil blade mounted on a rotatable hub, the improvement characterized by:
   an hydraulic pump driven by said blade for providing an hydraulic output,
   an hydraulic motor for yawing said blade in relation to a wind stream,
   a control means for yawing said blade into and out of the wind stream as desired,
   a wind vane,
   a first circuit means directed by said control means for controlling a first flow of said hydraulic output to drive said hydraulic motor such that said blade is yawed into and out of the wind stream, and
   a second circuit means for mechanically controlling, as a function of a position of said wind vane and a position of said blade, a second flow of said hydraulic output to control said hydraulic motor such that said blade is yawed out of the wind in an emergency.

6. The wind turbine of claim 5 wherein said second circuit means is characterized by:

a first signal controlled valve, said valve allowing said second flow therethrough upon a cessation of said signal thereto, said signal being provided by said control means, a second valve for controlling said second flow to control said hydraulic motor, and means for positioning said second valve such that said blade is yawed out of the wind.

7. The wind turbine of claim 6 wherein said means for positioning said second valve is characterized by:

a camming means attaching to said wind vane and to said second valve for positioning said second valve as a function of said position of said blade and said position of said wind vane, said camming means nulling said second valve if said blade and said wind vane are parallel to each other.

8. The wind turbine of claim 7 wherein said camming means is characterized by:

a camming wheel attaching to and rotating with said vane, and a cam rider attaching to said second valve said cam rider following a contour of said camming wheel as said camming wheel and said cam rider rotate relative to each other positioning said second valve thereby.

9. A wind turbine comprising an airfoil blade mounted on a rotatable hub, the improvement characterized by:

an hydraulic pump driven by said blade for providing an hydraulic output, an hydraulic motor driven by said hydraulic output for yawing said blade in relation to a wind stream, a control means for yawing said blade into and out of the wind stream as desired, a first circuit means directed by said control means for controlling a first flow of said hydraulic output to drive said hydraulic motor such that said blade is yawed into and out of the wind stream, and a second circuit means for mechanically controlling a second flow of said hydraulic output to control said hydraulic motor such that said blade is yawed out of the wind, said second circuit means yawing said blade if said control means fails to send a signal to said second circuit means.

10. The wind turbine of claim 9 wherein said second circuit means is characterized by:

a first valve controlled by said signal, said valve allowing said second flow to pass therethrough upon a cessation of said signal thereto, a second valve for controlling said second flow to control said hydraulic motor, and means for positioning said second valve such that said blade is yawed out of the wind.

11. The wind turbine of claim 10 wherein said means for positioning said second valve is characterized by:

a wind vane, a camming means attaching to said wind vane and to said second valve for positioning said second valve as a function of an angle between a plane formed by said rotating blade and a direction of said wind stream, said camming means nulling said second valve if said said plane is oriented approximately 0° to said direction of said wind stream.

12. The wind turbine of claim 11 wherein said camming means is characterized by:

a camming wheel attaching to and rotating with said vane, and a cam rider attaching to said second valve said cam rider following a contour of said camming wheel as said camming wheel and said cam rider rotate relative to each other positioning said second valve thereby.

* * * * *